United States Patent [19]

Kawano et al.

[11] Patent Number: 5,369,782
[45] Date of Patent: Nov. 29, 1994

[54] RADIO RELAY SYSTEM, INCLUDING INTERFERENCE SIGNAL CANCELLATION

[75] Inventors: Minori Kawano; Kohji Ogawa; Sadayuki Tsukagoshi; Hiroyuki Kuroiwa; Masato Sato, all of Gunma; Yasuhiro Ishizaki, Kanagawa; Fumiaki Komatsu, Kanagawa; Eiichi Kuroda, Kanagawa, all of Japan

[73] Assignee: Mitsubishi Denki Kabushiki Kaisha, Tokyo, Japan

[21] Appl. No.: 91,444

[22] Filed: Jul. 15, 1993

Related U.S. Application Data

[62] Division of Ser. No. 743,973, Aug. 12, 1991, Pat. No. 5,267,297.

[30] Foreign Application Priority Data

Aug. 22, 1990 [JP] Japan .................. 2-220530

[51] Int. Cl.$^5$ ........................... H04B 7/14
[52] U.S. Cl. ........................ 455/16; 455/17; 455/24; 455/79
[58] Field of Search ............. 455/9, 11.1, 15, 17, 455/20, 24, 78–79, 16; 375/3

[56] References Cited

U.S. PATENT DOCUMENTS

| | | | |
|---|---|---|---|
| 3,696,429 | 10/1972 | Tressa | 455/24 |
| 4,317,217 | 2/1982 | Davidson et al. | 455/24 |
| 4,475,243 | 10/1984 | Batlivala et al. | 455/24 |
| 4,481,645 | 11/1984 | Karabinis | 375/58 |
| 4,754,495 | 6/1988 | Kawano et al. | 455/17 |
| 4,776,032 | 10/1988 | Odate et al. | 455/24 |
| 4,894,663 | 1/1990 | Urbish et al. | 455/351 |
| 5,115,514 | 5/1992 | Leslie | 455/17 |

FOREIGN PATENT DOCUMENTS

| | | | |
|---|---|---|---|
| 0133148 | 10/1980 | Japan | 455/24 |
| 0051632 | 3/1983 | Japan | 455/24 |

*Primary Examiner*—Reinhard J. Eisenzopf
*Assistant Examiner*—Andrew Faile

[57] ABSTRACT

A radio relay system including a water-proof conductor housing on which is located a pair of antennas, one antenna being used for transmitting and receiving radio carrier wave signals of a first and a second frequency, respectively, while the other antenna is used for transmitting and receiving radio carrier wave signals of a third and a fourth frequency, respectively. A skirt for each of the antennas is located adjacent the antennas on the housing, one skirt has a length equal to a quarter of the wavelength of the first frequency while the other skirt has a length equal to a quarter wavelength of the third frequency. A relay circuit is located in the housing which includes circuitry for extracting and combining a portion of the radio carrier wave signals of the first and the third frequencies respectively radiated from the two antennas with the radio carrier wave signals of the first and third frequencies respectively received by the opposite antenna of the pair of antennas for cancelling unwanted local interference therebetween.

14 Claims, 9 Drawing Sheets

RADIO RELAY SYSTEM, INCLUDING INTERFERENCE SIGNAL CANCELLATION

This application is a division of copending application Ser. No. 07/743,973, filed on Aug. 12, 1991, now U.S. Pat. No. 5,267,297, the entire contents of which are hereby incorporated by reference.

BACKGROUND OF THE INVENTION

The present invention relates to a radio communication system which performs radio communication by transmitting and receiving radio carrier waves.

Figure 10:
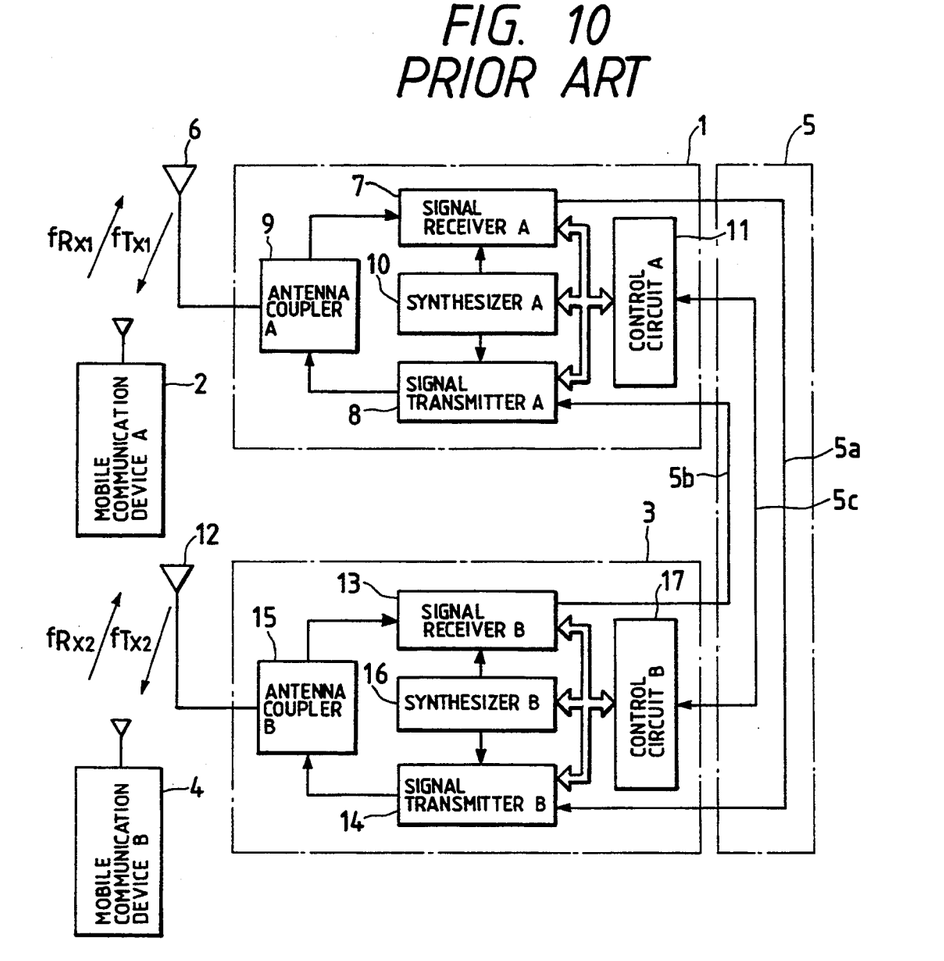
FIG. 10 is a block diagram showing a conventional radio system.
Figure 11:
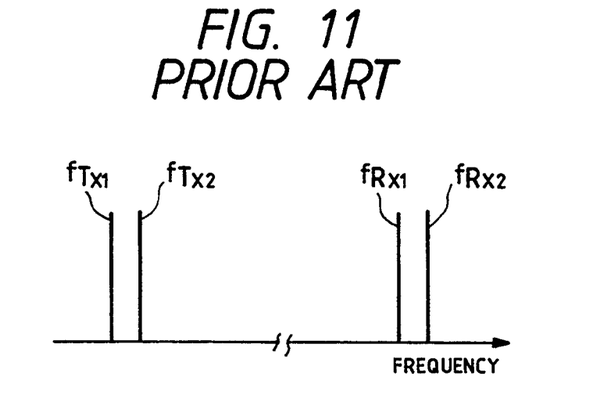
FIG. 11 is an explanatory diagram showing the frequency bands of radio carrier waves employed in the radio relay system shown in FIG. 10.

A conventional radio relay system which is one example of such a radio communication system is shown in FIGS. 10 and 11.

FIG. 10 is a block diagram showing a radio relay system employed, for instance, for mobile telephone devices. Reference may be made, for instance, to the publication "Mobile Communication—Theory and Principle", pp. 96 to 99, FIGS. 5.1, 5.2 and 5.3 published by the Electronic Communication Society. FIG. 11 is an explanatory diagram showing the frequency bands of radio carrier waves used in the radio relay system.

In FIG. 10, reference numeral 1 designates a radio relay device A which performs communication with a mobile communication device A 2; 3, a radio relay device B which perform communication with a mobile communication device B 4; and 5 a cable assembly connected between the radio relay device A 1 and the radio relay device B 3.

Further in FIG. 10, reference numeral 6 designates an antenna A for transmitting and receiving radio carrier waves; 7, a signal receiver A for receiving radio carrier waves through the antenna A 6; 8, a signal transmitter A for transmitting radio carrier waves through the antenna A 6; 9, an antenna coupler A through which radio carrier waves received by the antenna A are applied to the signal receiver A 7 and through which radio carrier wave are applied to the antenna 6 by the signal transmitter A 8; 10, a synthesizer the oscillation frequency of which determines the operating frequency of the signal receiver A 7 and the signal transmitter A 8; and 11, a control circuit A for controlling the operations of the signal receiver A 7, the signal transmitter A 8, and the synthesizer A 9. The arrangement of the radio relay device B 3 is similar to that of the radio relay device A 1 described above. That is, reference numeral 12 designates an antenna B for the relay device 3; 13, a signal receiver B; 14, a signal transmitter B; 15, an antenna coupler; 16, a synthesizer B; and 17, a control circuit B. The cable assembly 5 includes: a cable 5a through which radio carriers waves received by the signal receiver A 7 are transmitted to the signal transmitter B 14; a cable 5b through which radio carrier waves received by the signal receiver B 13 are applied to the signal transmitter A 8; and a cable 5c through which the control circuit A 11 and the control circuit B 17 are connected to each other to transmit various data between them.

It is assumed that a frequency $f_{RX1}$ is transmitted by the mobile communication device A 2 and received by the radio relay device A 1, and a frequency $f_{TX1}$ is transmitted to the mobile communication device A 2 by the radio communication device A 1. Furthermore, it is assumed that a frequency $f_{RX2}$ is transmitted by the mobile communication device B 4 and received by the radio relay device B 3, and a frequency $f_{TX2}$ is transmitted to the mobile communication device B 4 by the radio relay device B 3. The frequencies $f_{TX1}$ and $f_{TX2}$ are close to each other, and the frequencies $f_{RX1}$ and $f_{RX2}$ are also close to each other. And the frequency band covering the frequencies $f_{TX1}$ and $f_{TX2}$ and the frequency band covering the frequencies $f_{RX1}$ and $f_{RX2}$ are sufficiently spaced away from each other, so as to prevent the mutual interference between the transmitting radio carrier wave and the receiving radio carrier wave.

The operation of the radio relay system thus arranged will be described.

First, a signal transmission will be described in which a radio carrier wave is transmitted from the mobile communication device A 2 through the radio relay device A 1 and the radio relay device B 3 to the mobile communication device B 4. The radio carrier wave having the frequency $f_{RX1}$ transmitted by the mobile communication device A 2 is received by the antenna A 6, and applied through the antenna coupler A 9 to the signal receiver A 7, where it is detected. The output signal of the signal receiver A 7 is applied through the cable 5a, as a signal reception base band signal, to the signal transmitter A 8. The signal reception base band signal is modulated by the signal transmitter B 14 into the radio carrier wave having the frequency $f_{TX2}$, which is transmitted through the antenna coupler B 15 and the antenna B 12 to the mobile communication device B 4.

Next, a signal transmission opposite to the above-described signal transmission will be described in which a radio carrier wave is transmitted from the mobile communication device B 4 through the radio relay device B 3 and the radio relay device A 1 to the mobile communication device A 2. Similarly as in the above-described signal transmission, the radio carrier wave having the frequency $f_{RX2}$ transmitted by the mobile communication device B 4 is received by the antenna B 12. The radio carrier wave thus received is transmitted through the antenna coupler B 15, the signal receiver B 13, the cable 5b, the signal transmitter A 8, the antenna coupler A 9 and the antenna A 6, as the radio carrier wave having the frequency $f_{TX1}$, to the mobile communication A 2.

Now, a conventional cordless telephone system will be described which is another example of the radio communication system.

Figure 12:
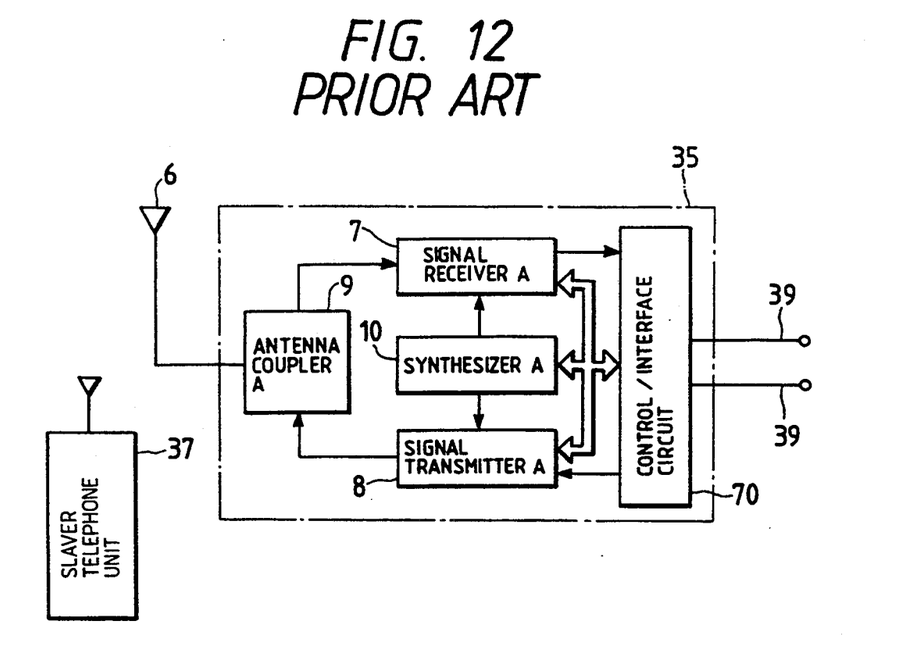
FIG. 12 is a block diagram showing a conventional cordless telephone system.

FIG. 12 is a block diagram showing the arrangement of the conventional cordless telephone system which is disclosed, for instance, by a paper "New Cordless Telephone", the publication "Shisetsu (Facilities)" 36, No. 3, 1979, pp. 134 to 141 published by the Electrical Communication Society. In FIG. 12, parts corresponding functionally to those which have been already described with reference to FIG. 10 are therefore designated by the same reference numerals or characters. Further in FIG. 12, reference numeral 35 designates a master telephone unit; 37, a slave telephone unit which performs communication through the antenna A 6 with the master telephone unit 35; and 70, a control/interface circuit for controlling the signal receiver A 7, the signal transmitter A 8 and the synthesizer A. The control/interface circuit 70 is connected to a telephone line 39 for signal transmission and reception.

The operation of the cordless telephone system thus organized will be described.

When the master telephone unit 35 receives an incoming calling signal through the telephone line 39 from outside, the control/interface circuit 70 causes the signal transmitter A to transmit a particular calling signal through the antenna A 6 in the air to the slave telephone unit A 37. Upon reception of the particular calling signal, the slave telephone unit is placed in communication state with the master telephone unit. The particular calling signal transmitted by the master telephone unit includes a registered ID (identification) number, so as to call the slave telephone unit corresponding to the ID number.

In the case when the slave telephone unit A 37 to call an external telephone unit, a calling signal outputted by the slave telephone unit is applied through the antenna A 6 and the antenna coupler A 9 to the signal receiver A 7, where it is detected. The output signal of the signal receiver is applied, as a calling signal, to the telephone line 39 through the control/interface circuit 70. The calling signal also includes a registered ID number; that is, the master telephone unit 35 receives only the calling signal including the registered ID number.

In general, such incoming calling signals, or outgoing calling signals, are received only by the master telephone unit and the slave telephone unit which have the registered ID numbers, and the master telephone unit is installed indoors.

Now, a conventional base station device for transmitting and receiving radio carrier waves will be described which is another example of the radio communication system.

Figure 13:
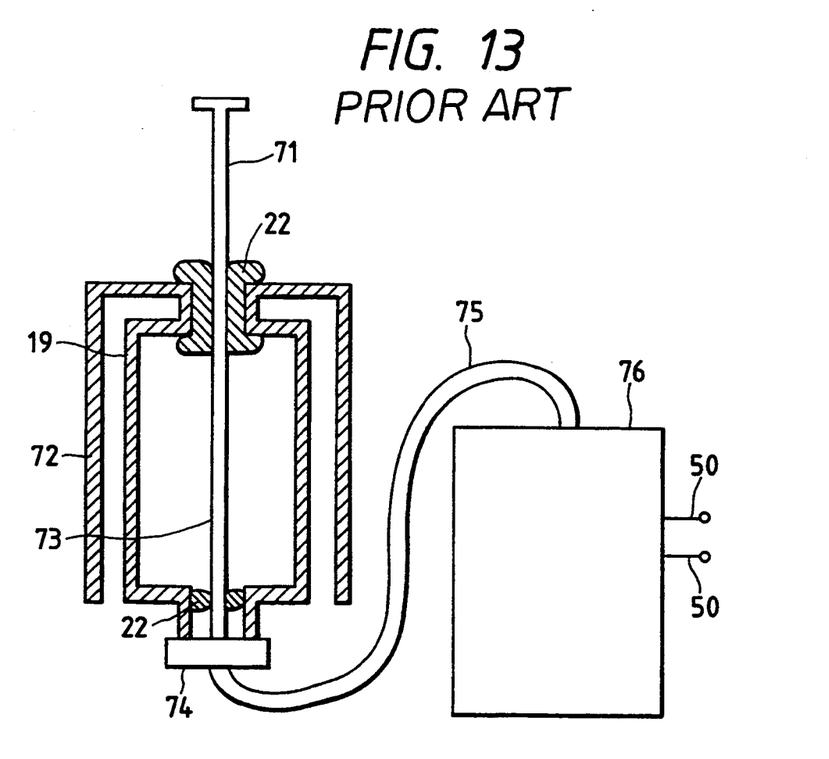
FIG. 13 is an explanatory diagram showing a conventional base station device.

FIG. 13 shows a base station device including a monopole antenna with a skirt which is disclosed by the publication "Antenna Engineering Handbook", page 137, FIGS. 5 and 7 edited by Electrical Communication Society, published by Ohm Co. In FIG. 13, reference numeral 71 designates an antenna radiation element; 19, a coaxial external conductor; 72, a skirt C connected to the external conductor 19; 22, water-proof rings for preventing the entrance of water into the external conductor 19; 73, a coaxial internal conductor; 74, a coaxial connector for connecting a coaxial cable 75; 76, a base station device body; and 50, connecting terminals for signal cables.

The operation of the base station device thus organized will be described.

The length of the antenna radiation element 71 and the skirt C 72 is set to about a quarter ($\frac{1}{4}$) of the wavelength $\lambda$ of a signal employed, so that the skirt C 72, forming a coaxial line with the external conductor 19, is placed in resonance with the frequency of a radio carrier wave which is transmitted or received through the radiation element 71. Hence, when the coaxial cable 75 is connected to the coaxial connector 74, transmission and reception of signals can be achieved through the coaxial cable with the base station device body 76, without being affected by the radio carrier wave. The radiation element 71 and the skirt C 72 form a half-wave dipole antenna, providing an excellent radiation characteristic. Communication signals are transmitted and received with the aid of the connecting terminals 50.

The conventional radio relay system is designed as described above. Therefore, in order to eliminate difficulties that the receiving radio carrier wave and the transmitting radio carrier wave interfere with each other, and the receiving radio carrier wave is suppressed in sensitivity by the transmitting radio carrier wave and noises outside the frequency band including the transmission frequency, it is necessary to space the signal transmitting frequency band and the signal receiving frequency band wide from each other as shown in FIG. 11. Hence, the relationships between the signal receiving frequency band and the signal transmitting frequency band are limited, and according the radio relay device is also limited in function.

With the conventional cordless telephone system as described above, only the slave telephone unit A 37 having the registered ID number can communicate with the master telephone unit 35; that is, the joint use of the master telephone unit 35 is not permitted. In other words, the master telephone unit 35 serves merely as relaying means between the slave telephone unit A 37 and an external telephone set, and there is no method of using the master telephone unit 35 by itself. Thus, the conventional cordless telephone is low in utilization factor. Furthermore, since the master telephone unit 35 is generally installed indoors, use of the slave telephone unit is limited indoors.

The base station device described above suffers from the following difficulties: In the base station device, the antenna is provided, as one unit, in addition to the base station device body 76, and the former is connected through the coaxial cable to the latter. Therefore, the installation is expensive.

SUMMARY OF THE INVENTION

Accordingly, a first object of the invention is to eliminate the above-described difficulties accompanying a conventional radio relay system. More specifically, a first object of the invention is to provide a radio relay system and a radio system which can positively communicate with mobile communication devices without limitation of the frequency bands of radio carrier waves used for signal transmission and reception (claims 1 and 4).

A second object of the invention is to eliminate the above-described difficulties accompanying a conventional cordless telephone system. More specifically, a second object of the invention is to provide a cordless telephone device in which the master telephone unit is improved in utility factor, and the slave telephone unit can be used even outdoors (claim 2).

A third object of the invention is to provide a base station device in which the base station device body and the antenna are provided as one unit, and the installation cost is reduced (claim 3).

According to a first aspect of the invention there is provided a radio relay system which comprises: an external conductor; a first antenna installed on the external conductor for transmitting and receiving a first radio carrier wave; a second antenna installed on the external conductor for transmitting and receiving a second radio carrier wave; a skirt provided around the second antenna, the skirt having a length equal to a quarter of the wavelength of the second radio carrier signal; and a relay device which includes: a branching filter for extracting a part of the second radio carrier wave as a carrier wave; an adjusting unit for adjusting the amplitude and phase of the carrier wave extracted by the branching filter; and a combining unit for combining the carrier wave extracted by the branching filter with the second radio carrier wave received through the first antenna wherein the relay device transmits as the second radio carrier from the second antenna the first radio carrier wave received by the first antenna.

According to a second aspect of the invention there is provided a cordless telephone system which comprises: a slave telephone device used at least outdoors; a master telephone device which is connected to a telephone line and installed indoors; an outdoor relay device which is connected to the master telephone device and installed outdoors to make communication with the slave telephone device; selecting means for selecting, according to an identification signal contained in a radio carrier wave which the outdoor relay device receives from the slave telephone device, communication between the salve telephone device and the master telephone device or communication between the slave telephone device and an external device over the telephone line; and water-proof means for preventing the entrance of water into the outdoor relay device.

According to a third aspect of the invention there is provided a base station device which comprises: an antenna for transmitting a radio carrier wave to a mobile communication device and receiving therefrom; a coaxial external conductor with a skirt having a length equal to a quarter of the wavelength of the radio carrier wave in such a manner that the skirt is provided around the coaxial external conductor; a radio section provided inside the coaxial external conductor to make radio communication with the mobile communication device through the antenna; and a connecting section for connecting the radio section to a telephone line.

According to a fourth aspect of the invention there is provided a radio system comprising: a first mobile communication device for transmitting a radio carrier wave; a second mobile communication device for receiving a radio carrier wave; and a radio relay device which receives the radio carrier wave transmitted by the first mobile communication device and transmits the radio carrier wave thus received to the second mobile communication device, in which the radio relay device comprises: an antenna for transmission and reception of the radio carrier wave; a signal receiver for receiving the radio carrier wave from the first mobile communication device; a signal transmitter for transmitting the radio carrier wave to the second mobile communication device through the antenna; a switch for selectively connecting one of the signal receiver and signal transmitter to the antenna; and a control section which divides the operation time of the radio relay device into a series of operation times, and causes the switch to connect the signal receiver and the signal transmitter alternately to the antenna in synchronization with the series of operation times.

In the radio relay system according to the first aspect of the invention, the system body i.e. conductive housing is isolated from the second antenna with the aid of the skirt, and a part of the second radio carrier wave transmitted through the second antenna is extracted as a carrier wave with a branching filter. The amplitude and phase of the carrier wave thus extracted is adjusted with an adjusting unit, and is combined by the combining unit with the second radio carrier wave received through the first antenna, which is adapted to receive the first radio carrier wave, thereby cancelling out the second radio carrier wave. Thus, the radio relay system is free from the difficulty where the second carrier wave can interfere with the first carrier wave.

In the cordless telephone system according to the second aspect of the invention, in accordance with the identification signal contained in the radio carrier signal received from the slave telephone device, the selecting means selects the communication between the slave telephone device and an external device or communication between the salve telephone device and the master telephone device. Thus, the master telephone device is improved in utilization factor as much. Furthermore, since the provision of the water-proof means makes it possible to install the outdoor relay device, the slave telephone device can be used in a wide area.

In the base station device according to the third aspect of the invention, the radio section connected through the connecting section to the telephone line is provided inside the coaxial external conductor with the skirt. Therefore, the base station device can be formed as one unit at low manufacturing cost. The radio section is placed in resonance with the radio carrier wave transmitted or received.

In the radio system according to the fourth aspect of the invention, the operation time of the radio relay device is divided into a series of operation times, and the switch is operated to connect the signal receiver and the signal transmitter alternately to the antenna in synchronization with the series of operation times. Therefore, with the radio system, the time for reception of the radio carrier wave transmitted by the first mobile communication device will never be overlapped with the time for transmission of the radio carrier wave to the second communication device; that is, the difficulty is eliminated that the radio carrier waves transmitted and received interfere with each other.

DESCRIPTION OF THE PREFERRED EMBODIMENTS

Figure 1:
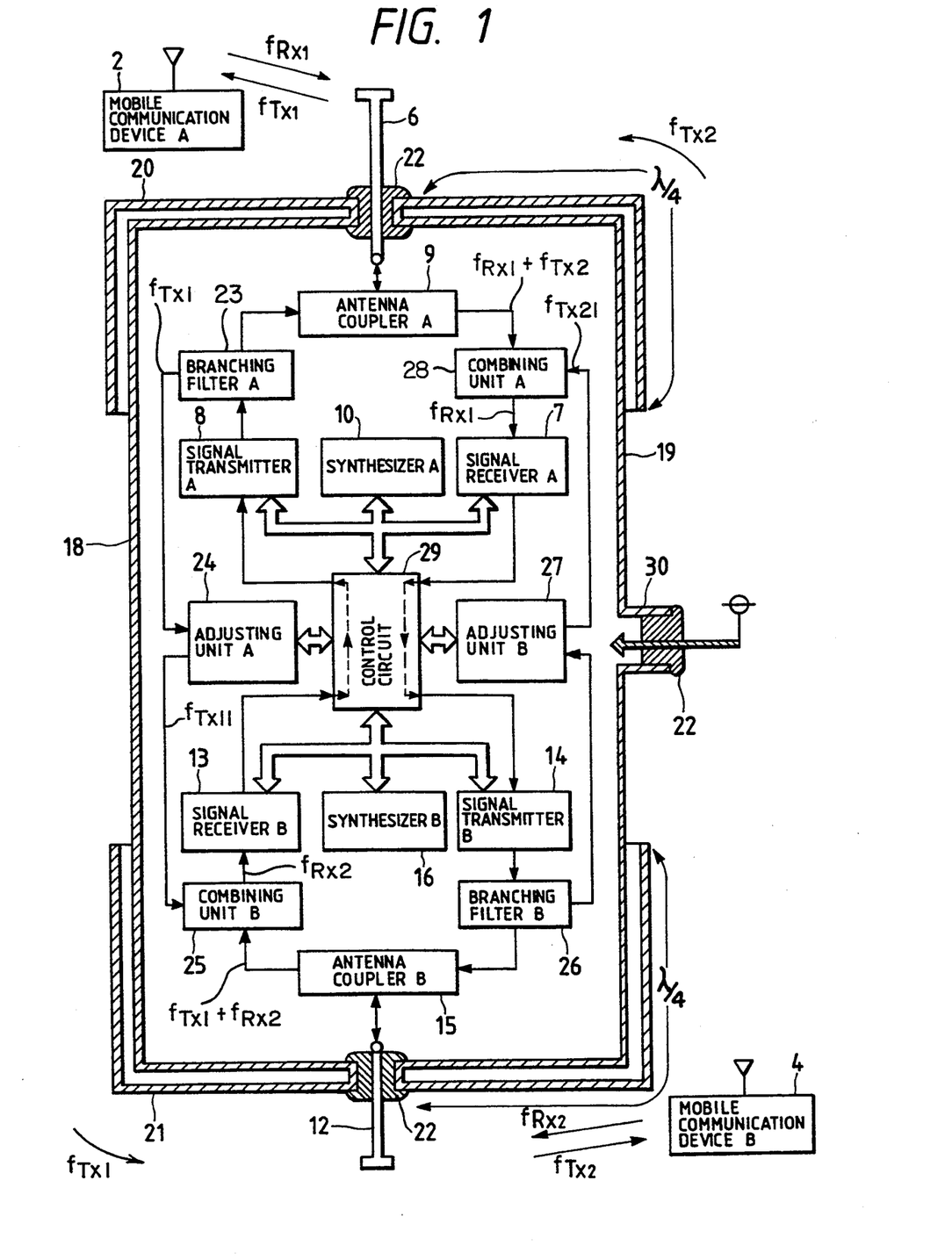
FIG. 1 is a block diagram showing a radio relay system according to a first embodiment of this invention.
Figure 2:
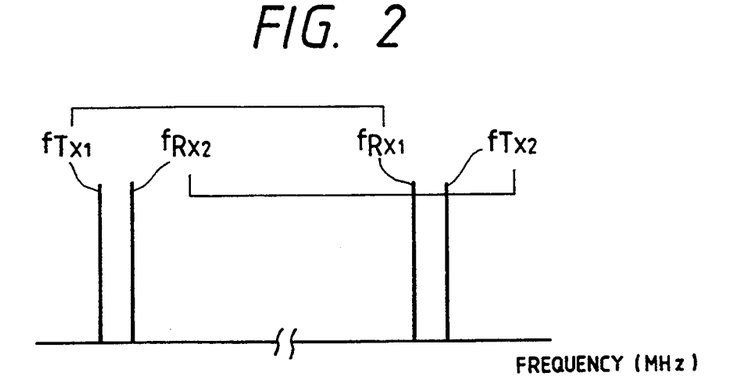
FIG. 2 is an explanatory diagram showing the frequency bands of radio carrier waves employed in the radio relay system.
Figure 3:
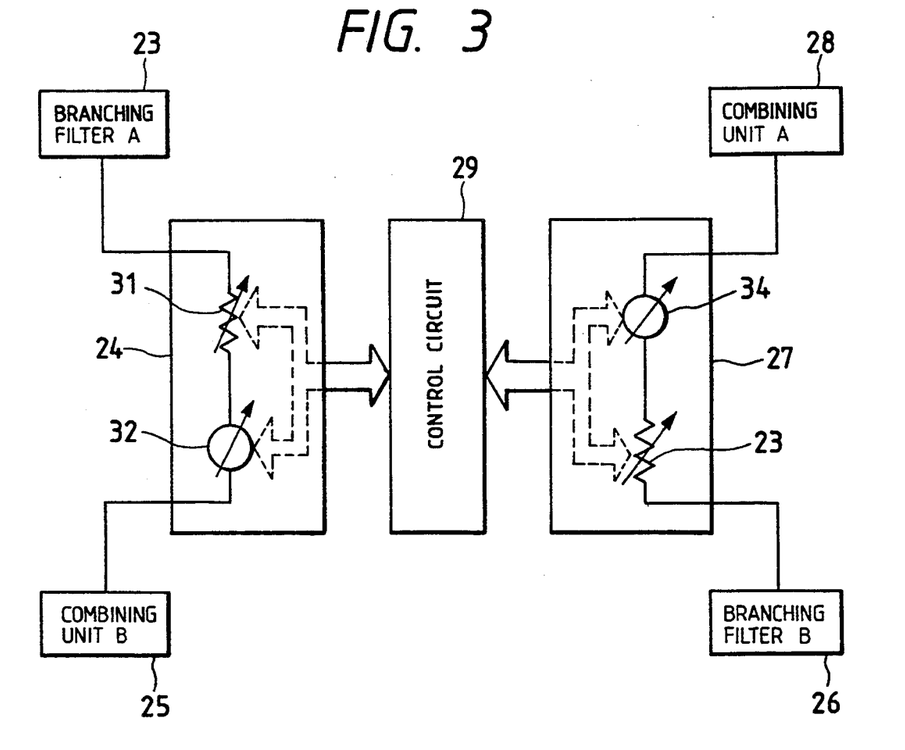
FIG. 3 is an block diagram showing the arrangement of adjusting units in the radio relay system.

FIG. 1 is an explanatory diagram, shown partly as a block diagram, depicting a radio relay system according to a first embodiment of the invention, FIG. 2 is an explanatory diagram showing the frequency bands of radio carrier waves employed in the radio system, and FIG. 3 is a block diagram of adjusting units in the radio system.

In FIG. 1, reference numeral 18 designates a radio relay apparatus which relays radio communications between a mobile communication device A 2 and a mobile communication device B 4; 6, an antenna for signal communication with the mobile communication device A 2; 12, an antenna for signal communication with the mobile communication device B 4; 19, an external conductor A which is the housing of the radio relay device 18; and 20 and 21, a skirt A and a skirt B, respectively, which are provided for the external conductor 19. The skirt A 20 has a length which is a quarter (¼) of the wavelength of the radio carrier wave transmitted through the antenna A 6, while the skirt B 21 also has a length which is a quarter (¼) of the wavelength of the radio carrier wave transmitted through the antenna B 12.

Further in FIG. 1, reference numeral 22 designates water-proof rings fitted between the external conductor A 19 and the antenna A 6 and the antenna B 12, to prevent the entrance of water into the external conductor A 19; 9, an antenna coupler A; 7, a signal receiver A; 8, a signal transmitter A; 10, a synthesizer; 15, an antenna coupler B; 13, a signal receiver B; 14, a signal transmitter B; 16, a synthesizer B; 23, a branching filter for dividing a radio carrier wave applied to the antenna coupler A 9; 24, an adjusting unit for adjusting the amplitude and phase of the radio carrier wave thus divided; 25, a combining unit B for combining the output radio carrier wave of the adjusting unit A 24 with the radio carrier wave applied through the antenna coupler B 15 to the signal receiver B; 26, a branching filter B; 27, an adjusting unit B; 28, a combining unit A; and 29, a control circuit for controlling the signal receiver A, the signal transmitter A 8, the synthesizer A 10, the adjusting unit A 24, the signal receiver B 13, the signal transmitted B 14, the synthesizer B 16, and the adjusting unit B 27. The control circuit 29 further serves as a signal transmission line in transmitting a radio carrier wave from the signal receiver A 7 to the signal transmitter B 14 and from the signal receiver B 13 to the signal transmitter A 8. An inlet 30 is provided on one side of the external conductor A 19 through which electric power is applied to the radio relay device 18. More specifically, the electric power is supplied over a telephone line. A water-proof ring 22 is fitted in the inlet 30 to prevent the entrance of water into the radio relay device.

The radio carrier waves employed have frequencies $f_{TX1}$, $f_{TX2}$, $f_{RX1}$, and $f_{RX2}$, similarly as in the above-described prior art. However, in order for the antenna coupler A 9 to divide the radio carrier waves transmitted and received through the antenna A 6 with ease, the frequencies $f_{TX1}$ and $f_{RX1}$ are shifted relatively far apart from each other, and the frequencies $f_{TX2}$ and $f_{RX2}$ are also shifted relatively far apart from each other as shown in FIG. 2. Furthermore, the frequencies $f_{TX1}$ and $f_{RX2}$ are set so as to be mutually close to each other, and similarly the frequencies $f_{TX2}$ and $f_{RX1}$ are set so as to be mutually close to each other.

In FIG. 3, reference numeral 31 designates a variable attenuator A for varying the amplitude of the output radio carrier wave from the branching filter A 23; and 32, a variable phase shifter A for changing the phase of the radio carrier wave.

Further in FIG. 3, reference numeral 33 designates a variable attenuator B for varying the amplitude of the output radio carrier wave from the branching filter B 26; and 34, a variable phase shift B for changing the phase of the radio carrier wave. Those variable attenuators and variable phase shifters are controlled by the control circuit 29.

The operation of the radio relay system thus configured will now be described.

Due to the skirt A 20, the external conductor housing A 19 is placed in resonance with the radio carrier wave transmitted through the antenna A 6, so that the external conductor A 19 is isolated from the antenna A 6, and similarly, due to the skirt B 21, the external conductor housing A 19 is isolated from the antenna B 12. This isolation eliminates the difficulty of high frequency radio carrier wave currents flowing between the antennas A 6 and B 12 through the external conductor A 19; that is, the antennas would normally be coupled to each other through the external conductor A 19.

Now, signal communication will be described which is made between the mobile communication device A 2 and the mobile communication device B 4 through the radio relay device 18.

A radio carrier wave having a frequency $f_{RX1}$ transmitted by the mobile communication device A 2 is received through the antenna A 6. The radio carrier wave thus received is applied through the antenna coupler A 9 and the combining unit A 28 to the signal receiver A 7, where it is detected. The output signal of the signal receiver A is applied through the control circuit 29 to the signal transmitter B 14, where it is modulated and amplified. The output signal of the signal transmitter B 14 is applied through the branching filter B 26 and the antenna coupler B 15 to the antenna B 12, and it is transmitted through the antenna B 12, as a radio carrier wave having a frequency $f_{TX2}$, to the mobile communication device B 4.

A radio carrier wave having a frequency $f_{RX2}$ outputted by the mobile communication device B 4, similarly as in the above-described case, is applied through the antenna coupler B 15 and the combining unit B 25 to the signal receiver B 13, where it is detected. The output signal of the signal receiver B 13 is applied through the control circuit 29 to the signal transmitter A 8, where it is modulated and amplified. The output signal of the signal transmitter A 8 is applied through the branching filter A 23 and the antenna coupler A 9 to the antenna A 6, and it is transmitted, as a radio carrier wave having a frequency $f_{TX1}$, to the mobile communication device A 2.

Each antenna can receive a radio carrier wave transmitted by the other antenna in addition to that which is transmitted by the predetermined mobile communication device. That is, the antennas can be coupled to one another through space. The reception of a radio carrier wave transmitted through the other antenna decreases the sensitivity for reception of a radio carrier wave from the respective mobile communication. A method of preventing the decrease of the sensitivity will be described.

In the case where a first radio carrier wave, or the radio carrier wave having the frequency $f_{RX2}$ (hereinafter referred to as "a radio carrier wave $f_{RX2}$", when applicable) and which is to be received by a first antenna, or the antenna B 12 is mixed with a second radio carrier wave, or the radio carrier wave having the frequency $f_{TX1}$ (hereinafter referred to as "a radio carrier wave $f_{TX1}$", when applicable), the sensitivity for reception of radio carrier waves is decreased as follows:

It is assumed that the coupling loss in the space between the antenna A 6 and the antenna B 12 is 30 Db, and the radio carrier wave $f_{TX1}$ from the signal transmitter A 8 is 10 mW ($\neq$123 dB). In this case, the radio carrier wave $f_{TX1}$ couples with the antenna B 12 and is 93 Db$\mu$V ($\neq$123 - 30). When the loss of the antenna coupler B 15 and the combining unit B 25 is 3 dB, the radio carrier waves enters the signal receiver B as much as 90 dB$\mu$V ($\neq$93 −3). Therefore, when, in the case where the sensitivity suppression characteristic of the signal receiver B 13 is 80 dB, it is required to suppress the radio carrier wave $f_{TX1}$ further −10 dB which enters the signal receiver, then it is necessary to decrease the radio carrier wave by 20 dB (16 90 - 80 - 10).

For this purpose, it is effective to increase the distance between the antenna A 6 and the antenna B 12; however, the increase is limited. Hence, the following method is employed: That is, the radio carrier wave $f_{TX1}$ applied to the antenna coupler A 9 is divided with the branching filter A 23, the output of which is applied to the adjusting unit 24, where it is adjusted in amplitude and phase by the variable attenuator A 31 and the variable phase shifter A 32 into a radio carrier wave $f_{TX11}$. And when the radio carrier wave $f_{TX1}$ received by the antenna B 12 is applied through the antenna coupler B 15 to the combining unit B 25, it is canceled out being combined with the radio carrier wave $f_{TX11}$.

It is assumed that the transfer function $E_{x1}$ of the radio carrier wave $f_{TX1}$ which is radiated to the antenna A 6 and received by the antenna B 12, and the transfer function $E_{x11}$ of the radio carrier wave $f_{TX11}$ applied to the adjusting unit A 24 through the branching filter A 23 are as follows:

$$E_{x1} = A_x \sin(WT_{x1} + \phi_x)$$

where $A_x$ is the amplitude, $\phi_x$ is the phase, and W is the angular frequency.

$$E_{x11} = A_i \sin(WT_{x1} + \phi_i)$$

where $A_i$ is the amplitude, $\phi_i$ is the phase, and W is the angular frequency.

In this case, the transfer function $E_x$ of the radio carrier wave formed by the combining unit B 25 is:

$$E_x = A_x \sin(WT_{x1} + \phi_x) + A_i \sin(WT_{x1} + \phi_i)$$

When the amplitude and phase of the radio carrier wave $f_{TX11}$ are adjusted by the adjusting unit so that $A_i = A_x$, and $\phi_i = \phi_x - \pi$, then $$E_x = 0$$

Thus, the radio carrier wave $f_{TX1}$ entering the antenna B 12 can be canceled out. That is, the entrance of the 20 dB radio carrier wave $f_{TX1}$ can be suppressed.

In the case where the radio carrier wave $f_{TX2}$ radiated to the antenna B 12 is received by the antenna A 6, similarly the branching filter B 26, the adjusting unit B 27, and the combining unit 28 are operated to combine a radio carrier wave $f_{TX21}$ with the radio carrier wave $f_{TX2}$ to cancel out the latter.

In the above-described embodiment, each of the antennas A 6 and B 12 is a mono-pole antenna with a skirt; however, it may be replaced, for instance, with a plate-shaped antenna, a folded antenna, or a co-linear antenna.

Furthermore, in the above-described embodiment, the radio relay apparatus 18 includes a pair of radio relay devices. However, it goes without saying that the technical concept of the invention is equally applied to a radio relay apparatus including plural pairs of radio relay devices.

In the above-described embodiment, the variable attenuators and the variable phase shifters are adjusted by the control circuit at all times; however, they may be so modified that they are fixed after being adjusted once, or they are periodically adjusted.

In the above-described embodiment, one adjusting unit is provided for each radio carrier wave; however, a plurality of adjusting units may be provided in the case where the coupling of the antennas in space is due to multiplex propagation.

A cordless telephone system according to a second embodiment of the invention will be described with reference to FIGS. 4 and 5.

Figure 4:
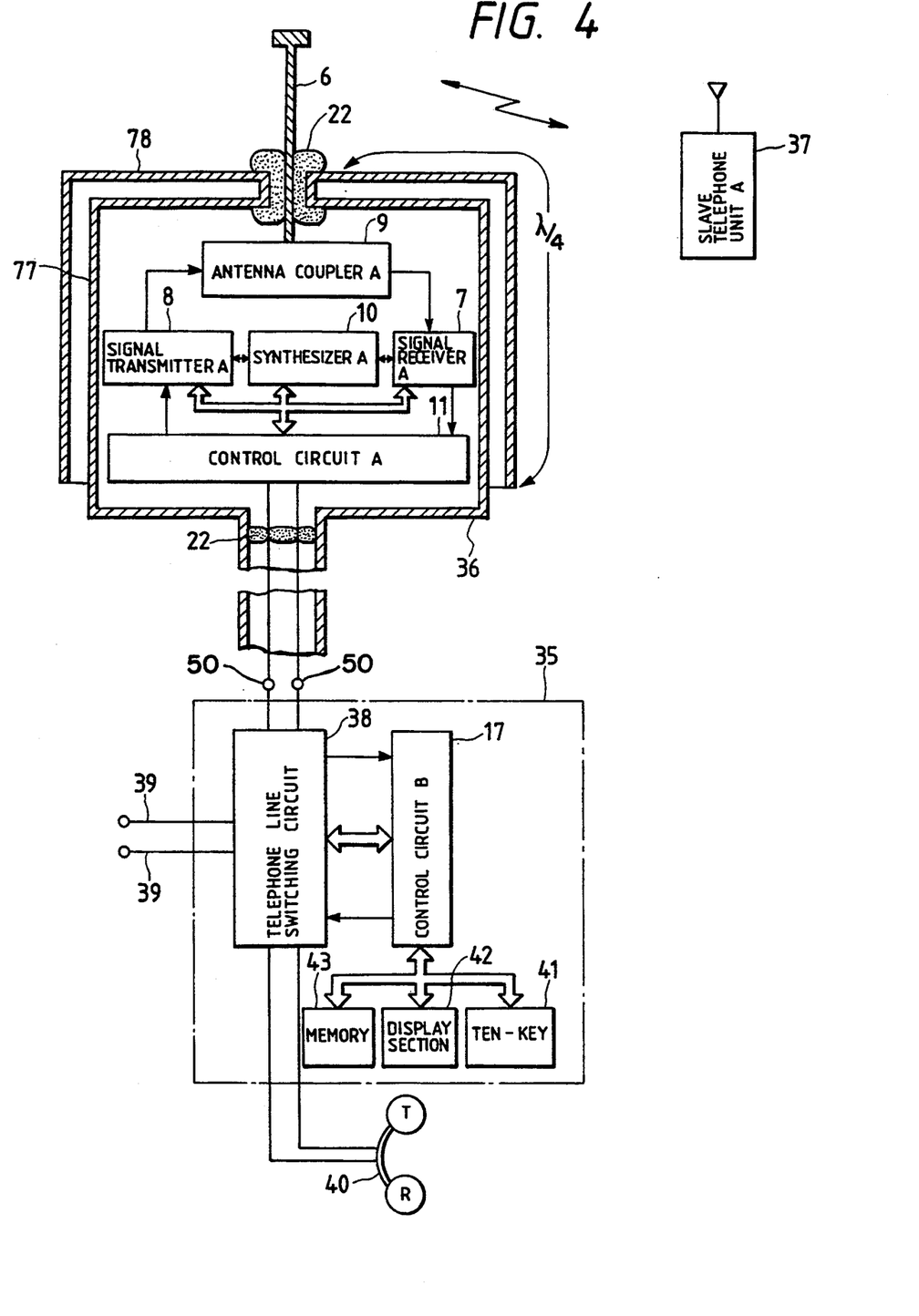
FIG. 4 is a block diagram showing the arrangement of a first example of a cordless telephone system according to a second embodiment of the invention.
Figure 5:
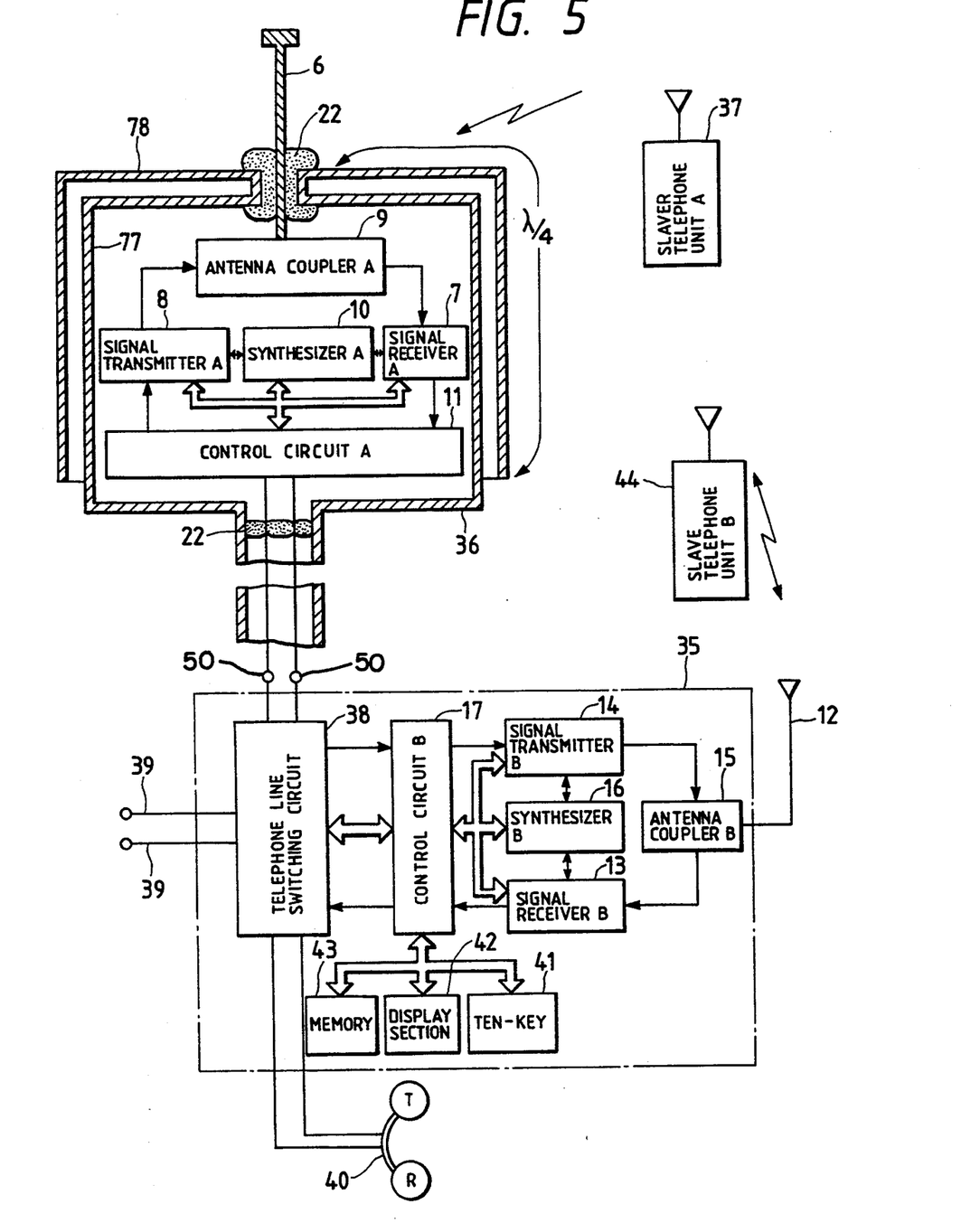
FIG. 5 is a block diagram showing the arrangement of a second example of the cordless telephone system.

FIG. 4 shows a first example of the cordless telephone system which has one slave telephone device 37, and FIG. 5 shows a second example which has two slave telephone devices 37 and 44. In FIGS. 4 and 5, reference numeral 36 designates an outdoor relay device connected to a master telephone device 35; 77 an external conductor B which forms the housing of the outdoor relay device; and 78, a skirt D forming the skirt section of the external conductor B 77. The external conductor B 77 provides a water-proof structure; that is, it together with a water-proof ring 22 prevents the entrance of water such as rain and snow into the outdoor relay device 36. The skirt D also provides a water-proof structure, and it has a length corresponding to a quarter ($\frac{1}{4}$) of the wavelength of a radio carrier wave transmitted through an antenna A 6. The external conductor B 77, the water-proof ring 22, and the skirt D 78 form water-proof means. Further in FIG. 4, reference numerals 6 through 17, 20, 35, 37 and 39 designate the components which are equal to or correspond functionally to those which have been designated by the same reference numerals in the above-described prior art or in the embodiment shown in FIG 1. Further in FIG. 4, reference numeral 38 designates a telephone line switching circuit which connects the telephone line 39, the control circuit A 11, the control circuit B 17, and a telephone handset 40 to one another; 41, a ten-key for inputting (dialing) telephone numbers for instance; 42, a display section for displaying various data including telephone incoming or outgoing calling signals; and 43, a memory for storing various data. The ten-key 41, the display section 42, and the memory 43 forming selecting means, are controlled by the control circuit B 17. Further in FIG. 5, reference numeral 44 designates a slave telephone device B which performs telephone communication through the antenna B 12.

The master telephone device 35 is installed inside a house, while the outdoor relay device 36 is installed outside at a predetermined height. And the master telephone device 35 is connected through a coaxial line to the outdoor relay device 36.

The slave telephone device A 35 is used mainly outdoors, and its service area is up to about 500 meters from the outdoor relay device 36.

In the case of FIG. 5, the second example, the slave telephone device B 44 is used mainly near the master telephone device 35 inside the house.

The cordless telephone system shown in FIG. 4 operates as follows:

When the slave telephone device A 37 makes a telephone call, a radio carrier wave, which is an outgoing calling signal outputted by the slave telephone device A 37, is received by the antenna A 6, and is applied through the antenna coupler A 9 to the signal receiver A 7, where it is amplified and detected. The output signal of the signal receiver A 7 is applied to the control circuit 11, where the ID number and the called party's number contained in the outgoing calling signal are decoded, and are then applied through the telephone line switching circuit 38 to the control circuit B 17. In the control circuit B 17, the ID number thus detected is referred to those in the ID number memory area in the memory 43. When it is determined that it is a particularly registered number for calling an external telephone device, the control circuit 17 controls the telephone line switching circuit 38 so as to allow the slave telephone device 37 to make a telephone call over the telephone line 39. When, on the other hand, it is determined that it is an ordinary registered number, the telephone line switching circuit 38 is connected to the handset 40 to allow the slave telephone device to call the master telephone device 35, so that telephone communication is held between the master and slave telephone devices 35 and 37.

The cordless telephone system shown in FIG. 5 operates as follows:

A telephone call over the telephone line 39 by the slave telephone device A 37, and telephone communication between the master and slave telephone devices 35 and 37 are the same as those described above with reference to FIG 4. Therefore, only communications using the slave telephone device B 44 will be described.

When the slave telephone device B 44 makes a telephone call, a radio carrier wave which is a outgoing calling signal outputted by the slave telephone device B 44 is applied through the antenna B 12, the antenna coupler B 15 and the signal receiver B 13 to the control circuit B 17, where the ID number and the called party's number contained in the outgoing calling signal are read. The ID number thus read is referred to those in the ID number memory area in the memory 43. When it is determined that it is a particular registered number for calling an external telephone device, the telephone line switching circuit 38 is connected to the telephone line 39 so as to allow the slave telephone device to make a telephone call over the telephone line 39. When, on the other hand, it is determined that it is a registered number for communication with the master telephone device 35, the telephone line switching circuit 38 is connected to the handset 40 to allow the slave telephone device 44 to call the master telephone device 35, so that telephone communication is held between the master and slave telephone devices 35 and 44. When it is determined that it is a registered number for communication with the other slave telephone device A 37, the telephone line switching circuit 38 is connected to the control circuit via signal cable connecting terminals 50, so as to allow the slave telephone device B 4 to make communication with the salve telephone device A 37 through the outdoor relay device 36.

In the above-described embodiment, one master telephone device 35 and one outdoor relay device 36 are provided; however, the embodiment may be so modified that a plurality of master telephone devices and a plurality of outdoor relay devices are provided, or a plurality of master telephone devices and one outdoor relay device, or one master telephone device and a plurality of outdoor relay devices are employed.

In the above-described embodiment, the outdoor relay device 36 has an coaxial external conductor D 77 with a skirt A 78; however, instead of the skirt, a ground line or ground plate having a water-proof structure may be employed.

Further in the above-described embodiment, a coaxial line is employed to connect the outdoor relay device 36 to the master telephone device 36; however, it may be replaced with a metal pipe. In this case, the metal pipe will serve as a support.

If an ID number is registered in another master telephone device which permits communication with the slave telephone device A 37, then communication can be held between the salve telephone device A 37 and that master telephone device 35.

If a transfer function is given to the master telephone device 35, a cordless telephone device having an ID number registered ordinarily can be connected to the telephone line 39.

Figure 6:
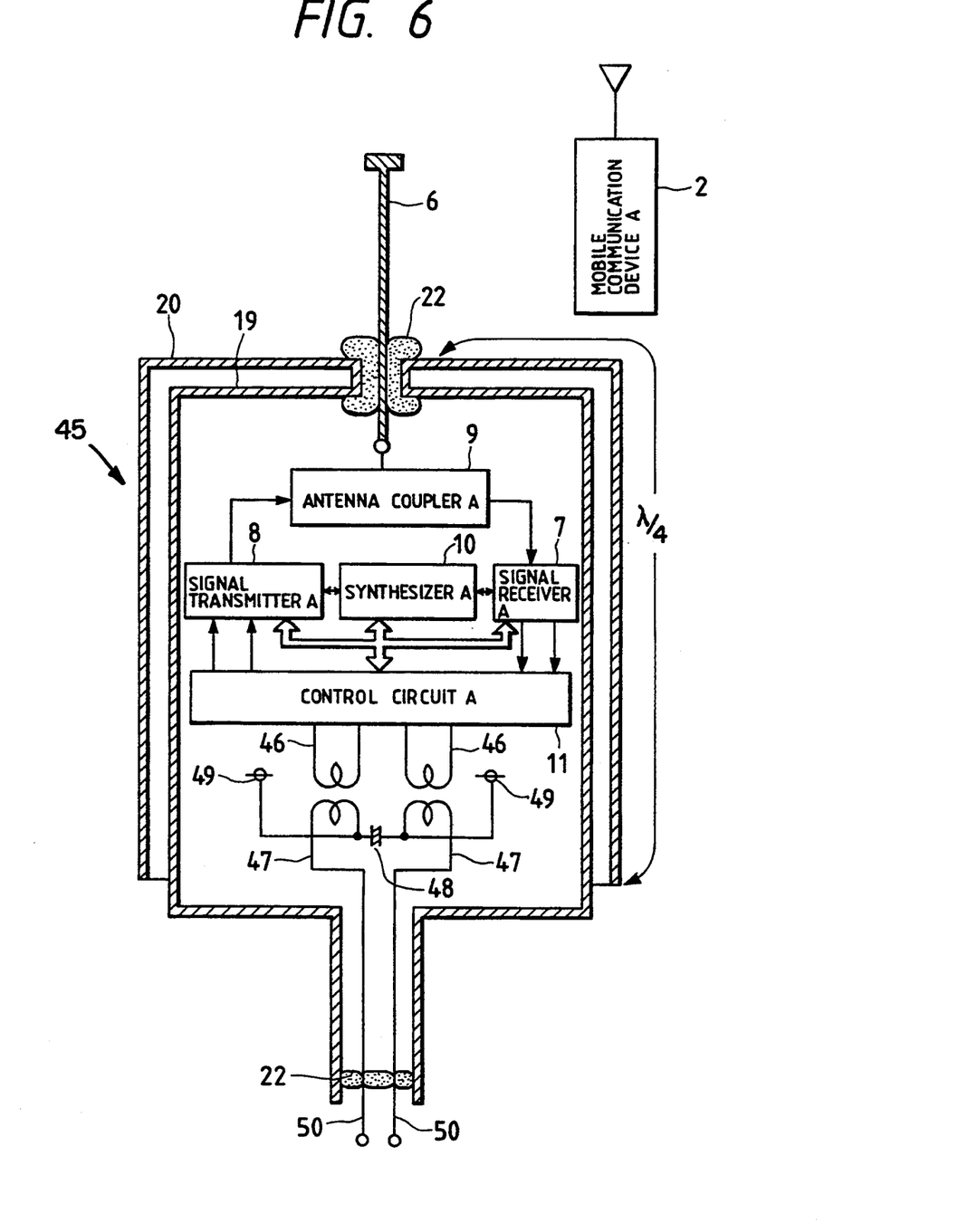
FIG. 6 is a block diagram showing the arrangement of a first example of a base station device having a dipole antenna with a pipe according to a third embodiment of the invention.

A base station device according to an embodiment aspect of the invention will be described with reference to FIGS. 6 and 7. FIG. 6 shows a first example of the base station device which employs a dipole antenna with a pottery pipe, and FIG. 7 shows a second example of the base station device which employs a "discone" antenna.

Figure 7:
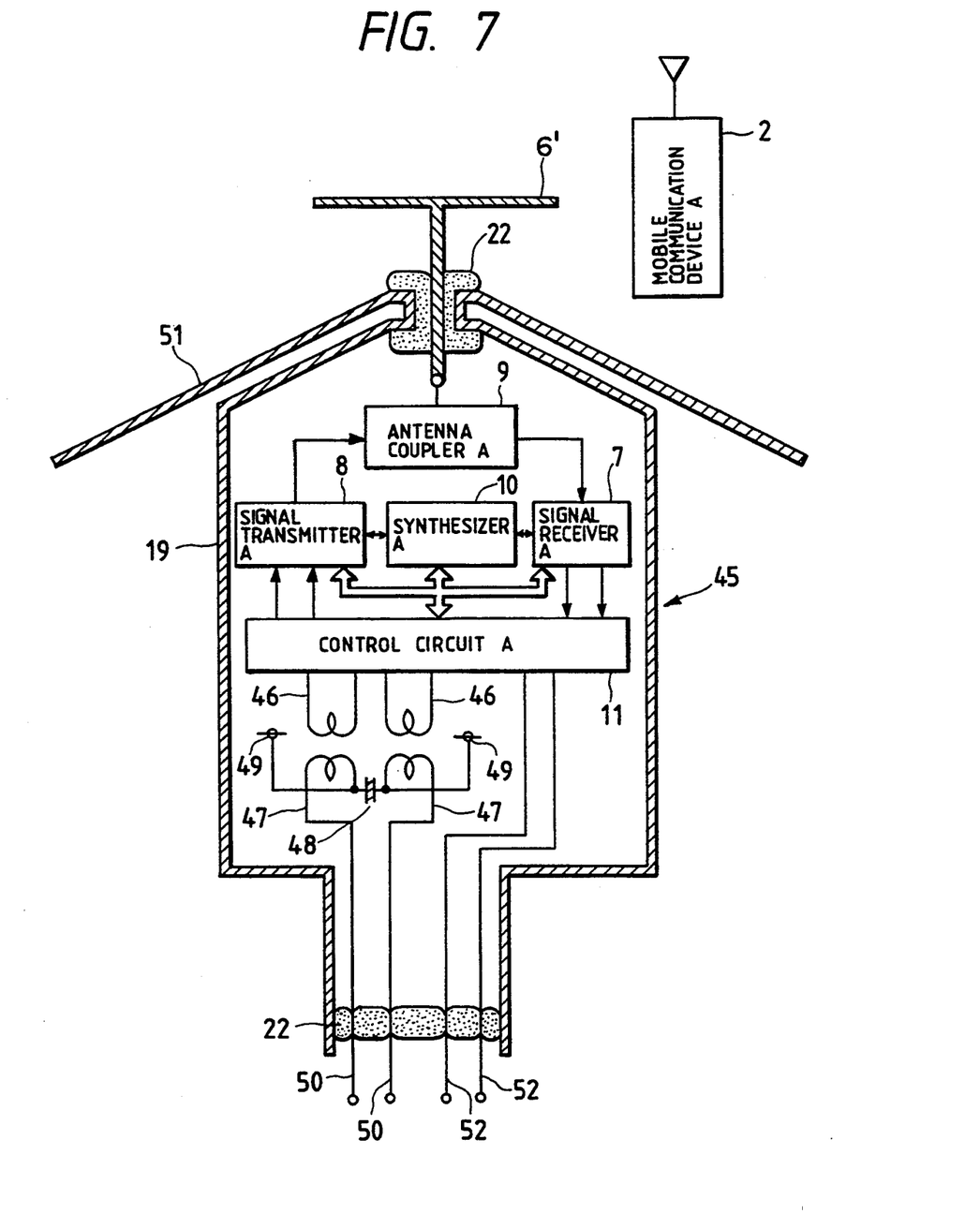
FIG. 7 is a block diagram showing the arrangement of a second example of the base station device.

In FIGS. 6 and 7, reference numerals 2, 6 through 11, 19, 20 and 22 designate the components which are equal to or correspond functionally to those which have been designated by the same reference numerals in the above-described prior art or in the above-described embodiments. Further in these Figures, reference numeral 45 designates the base station device which includes the control circuit A 11 which controls the signal receiver A 7, the signal transmitter A 8, and the synthesizer A 10, and serves as an interface between the signal transmitter A 7 and the signal receiver A 8 and an external device. Further in the Figures, reference numerals 46 and 47 designate windings A and B of a hybrid transformer, respectively; 49, DC voltage supply terminals; 50, signal cable connecting terminals. Further in FIG. 7, reference numeral 51 designates a conical ground plate of a discone antenna; and 52, control lines for making access to the control circuit A 11.

In FIG. 7, the antenna 6', and the conical ground plate 51 are aerial sections and external conductor 19 with the skirt as shown in FIG. 6 are outside of a coaxial cable, not shown. The components 9 through 11, and 46 through 49 provided inside the external conductor A 19 form a radio section, and the connecting terminals 50 form a connecting section.

The operation of the base station device shown in FIG. 6 will now be described.

The length of the skirt A 20 is set to a quarter ($\frac{1}{4}$) of the wavelength of the operating frequency signal in the base station device. Therefore, the skirt 20 and the external conductor 19 are placed in resonant state, so that the external conductor 19 is isolated from the antenna 6. In addition, the external conductor 19 and the skirt 20 protects the whole base station device from the direct sun light; more specifically, it prevents not only the temperature rise of the base station device which is due to the direct sun light, but also the internal components from deterioration and damage. The connecting terminals 50 are connected to the telephone line, so that a DC voltage superposed on the audio signal is applied to the base station device through the telephone line. The DC voltage is extracted by means of a coupling capacitor 48, and applied through the supply terminals 49 to various parts in the base station device 45.

The mobile communication device A 2 is called through the base station device 45 as follows: A tone signal superposed on the DC voltage is applied through the telephone line 39 (FIGS. 4 and 5) to the connecting terminals 50. The tone signal thus applied flows in the windings B 47 through the coupling capacitor 48, so that it appears in the windings A 46. The control circuit A 11 decodes the tone signal to cause the signal transmitter A 8 to output a calling signal to call the mobile communication device 2. The calling signal thus outputted is applied through the antenna coupler A 9 to the antenna A 6, through which it is radiated in space.

The mobile communication device A 2 can make telephone communication through the base station device 45 as follows: A calling signal outputted by the mobile communication device A is received by the antenna A 6. The calling signal thus received is applied through the antenna coupler A 9 to the signal receiver A 7, where it is detected. The output signal of the signal receiver A is applied to the control circuit A 11, where it is decoded. As a result, the tone signal flows in the windings A 46, and it appears in the windings B 47, thus being applied to the telephone line 39 through the connecting terminals 50.

The second example of the base station device shown in FIG. 7 employs the conical ground plate 51 of a "discone" antenna instead of the skirt A 20 (FIG. 6) as was described above. In the device, the components built in the external conductor A 19 are insulated from the disc-shaped radiation element 6' of the "discone" antenna, control lines for making access to the control circuit A 11. The provision of the control lines 52 for making access to the control circuit A 11 makes it possible to perform various control operations of the base station device at high speed.

The skirt A 20 in the first example of the base station device shown in FIG. 6, and the conical ground plate 51 of the "discone" antenna in the second example shown in FIG. 7 may be replaced with a flat ground plate or a ground line.

Furthermore, the antenna 6 and 6' may be replaced, for instance, with a linear folded antenna, a plate antenna, or an L-shaped or T-shaped blade antenna with the same effects.

Figure 8:
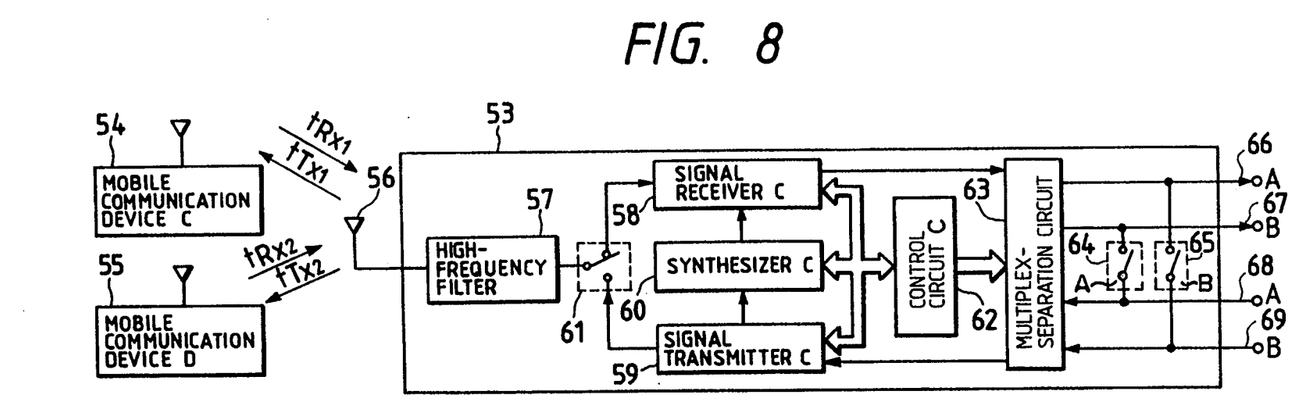
FIG. 8 is a block diagram showing the arrangement of a radio system according to a fourth embodiment of the invention.

A radio system according to a fourth aspect of the invention will be described with reference to FIGS. 8 and 9. FIG. 8 is a block diagram showing the arrangement of the radio system, and FIG. 9 is a time chart showing radio communication between mobile communication devices and a radio relay device.

In FIG. 8, reference numeral 53 designates a radio relay device for relaying radio communication between a first mobile communication device, namely, a mobile communication device C 54 and a second mobile communication device, namely, a mobile communication device D 55; 56, an antenna; 57, a high frequency filter connected to the antenna 56 to remove noise components from radio carrier waves transmitted and received; 58, a signal receiver C; 59, a signal transmitter; 60, a synthesizer for determining the operating frequencies of the receiver 58 and transmitter 60; 61; an antenna switch for connecting the high frequency filter 57 to the signal receiver C 58 or the signal transmitter C 59; 62, a control section, namely, a control circuit C; 63, a multiplex-separation circuit; 64, a relay switch A; 65 a relay switch B; 66, a signal reception base band signal output terminal A (hereinafter referred to as "a signal reception output terminal A", when applicable); 67, a signal reception base band signal output terminal B (hereinafter referred to as "a signal reception output terminal B", when applicable); 68, a signal transmission base band signal input terminal A (hereinafter referred to as "a signal transmission input terminal A", when applicable); and 69, a signal transmission base band input terminal B (hereinafter referred to as "a signal transmission input terminal B", when applicable).

Figure 9:
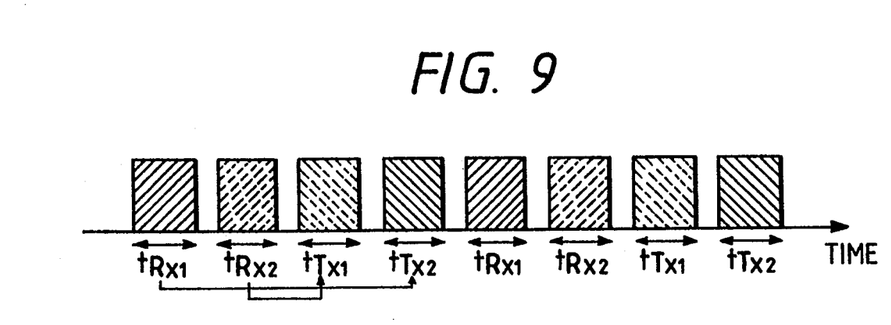
FIG. 9 is a time chart showing the times of radio communication between a radio relay device and mobile communication devices.

In FIG. 9, reference characters $t_{RX1}$ and $t_{TX1}$ designate a signal transmission time width and a signal reception time width of the mobile communication device C, respectively, and reference characters $t_{RX2}$ and $t_{TX2}$ designate a signal transmission time width and a signal reception time width of the mobile communication device D, respectively.

First, radio communication will be described which is held between any one of the mobile communication devices and an external device (not shown).

A radio carrier wave outputted by the mobile communication device C 54 is received by the antenna C 56 with the time width $t_{RX1}$. The radio carrier wave thus received is applied to the high frequency filter 57, where noise components are removed from the radio carrier wave. The radio carrier wave thus processed is applied through the antenna switch 61 to the signal receiver C 58, where it is detected. The output signal of the signal received C is applied to the multiplex-separation circuit, where it is converted into a signal reception base band signal, which is applied through the signal reception output terminal A 66 to the external device. On the other hand, a radio carrier wave transmitted by the second mobile communication device D 55 is received by the antenna C 56 with the time width $t_{RX2}$. The radio carrier wave thus received is applied through the high frequency filter 57, the antenna switch 61 and the signal receiver C 58 to the multiplex-separation circuit 68, the output of which is applied through the signal reception output terminal B 67 to the external device.

When, on the other hand, a signal transmission base band signal is applied to the signal transmission input terminal A 68 by the external device, it is encoded by the multiplex-separation circuit 63. The output of the circuit 63 is applied to the signal transmitter C 59, where it is modulated. The output signal of the signal transmitter C is applied through the antenna switch 61, the armature of which has been tripped to select the signal transmitter C, and through the high frequency filter 57 to the antenna C 56. That is, the output signal of the signal transmitter C is transmitted, with the time width $t_{TX1}$, to the external device through the antenna C. When a signal transmission base band signal is applied to the signal transmission input terminal B 69 by the external device, it is applied through the multiplex/-separation circuit 63 to the signal transmitter C 59. The output of the signal transmitter C is applied through the antenna switch 61 and the high frequency filter 57 to the antenna C, so that it is transmitted, with the time width $t_{TX2}$, to the mobile communication device D through the antenna C.

Radio communication will be described which is held between the mobile communication devices through the radio relay device 53.

First, the relay switch A 64 is turned on to connect the signal output terminal B 67 to the signal input terminal A 68, and the relay switch B 65 is also turned on to connect the signal output terminal A 66 to the signal input terminal 69. When, under this condition, a radio carrier wave transmitted by the mobile communication device C 54 is received, with the time width $t_{RX1}$, by the antenna C 56 of the radio relay device 53, the radio carrier wave is applied through the high frequency filter 57, the antenna switch 61, the signal receiver C 58 and the multiplex-separation circuit to the relay switch b 65. Since the relay switch is closed, the radio carrier wave is returned to the antenna C 56. More specifically, the radio carrier wave is applied through the multiplex-separation circuit 63, the signal transmitter C 59, the antenna switch 61, the high frequency filter 57 to the antenna C 56. Thus, the radio carrier wave is transmitted, with the time width $t_{TX2}$, to the mobile communication device D 55. On the other hand, the mobile communication device D 55 can transmit a radio carrier wave to the mobile communication device C 54 in the same manner. That is, the radio carrier wave transmitted by the mobile communication device D 55 is received by the antenna C 56 with the time width $t_{RX2}$. The radio carrier wave thus received is applied through the high frequency filter 57, the antenna switch 61, the signal receiver C 58, the multiplex-separation circuit 63, the relay switch A 64, the multiplex-separation circuit 63, the signal transmitter C 59, the antenna switch 61 and the high frequency filter 57 to the antenna C 56 in the state order. As a result, the radio carrier wave is transmitted, with the time width $t_{TX1}$, to the mobile communication device C 54 through the antenna C 56.

The time for radio communication held between the two mobile communication devices through the radio relay device 53 is as shown in FIG. 9. That is, the radio carrier wave received with the time width $t_{RX1}$ is transmitted with the time width $t_{TX2}$, and the radio carrier wave received with the time width $t_{RX2}$ is transmitted with the time width $t_{TX1}$. Hence, with the radio system of the invention, the difficulty is eliminated that a plurality of radio carrier waves are received or transmitted at the same time. That is, the mutual interference of radio carrier waves is prevented.

In the radio relay device 53, the control circuit C 62 controls the operations of the signal receiver C 58, the signal transmitter C 59, the synthesizer C 60, the antenna switch 61, the multiplex-separation circuit 63, the relay switch A 64, and the relay switch B 65.

In the above-described radio system, in the radio communication between the mobile communication devices, the base band signal of the multiplex-separation circuit 63 is utilized to return the radio carrier wave through the relay switch A or the relay switch B to the antenna. However, the radio system may be so modified that the signal receiver C 58 is coupled to the signal transmitter C 59 to return the radio carrier wave received to the antenna.

The above-described radio system employs only one radio relay device 53, that is, it is operated in a single stage relay mode; however, it may be so modified as to use a plurality of radio relay devices; i.e., to operate in a multiple stage relay mode.

Furthermore, in the above-described embodiment, two pairs of time widths are provided for signal transmission and reception; however, the invention is not limited thereto or thereby. That is, the above-described radio system may be so modified that it includes a plurality of mobile communication devices, and more than two pairs of time widths are provided for signal transmission and reception.

As was described above, the radio relay system according to the first aspect of the invention is so designed that the second radio carrier wave received through the first antenna is canceled out by combining it with a part of the second radio carrier wave which has been adjusted both in amplitude and in phase. Hence, in reception of the radio carrier wave, the radio relay device is prevented from being decreased in sensitivity, and the interference of the signal transmission frequency with the signal reception frequency can be eliminated. Thus, the radio carrier wave frequency band can be freely selected.

In the cordless telephone system according to the second embodiment of the invention, with the aid of the selecting means it is determined from the identification signal which the master telephone device receives from the slave telephone device whether or not communication is acceptable between them, and communication between the slave telephone device and an external device or communication between the salve telephone device and the master telephone device is selected, and the outdoor relay device with the water-proof means is installed outdoors. Hence, with the cordless telephone system of the invention, the range of places for use of the slave telephone device is greatly increased. In the case where the master telephone device is employed as the base station of a cordless telephone system, it can be commonly used by a plurality of slave telephone devices which transmits and receives one and the same identification signal. In this case, the master telephone device is markedly improved in utilization factor.

In the base station device according to the third embodiment of the invention, the radio section is provided inside the coaxial external conductor, and the skirt of the coaxial external conductor is provided around the antenna. Owing to this construction, the device is provided as one unit. Accordingly, the base station device can be installed with ease, and is decreased in running cost as much. Furthermore, since the radio section is placed in resonance with the radio carrier wave, the base station device provides an excellent radio wave radiation characteristic.

In the radio system according to the fourth embodiment of the invention, the operation of the radio relay device is time-shared so that one radio carrier wave is transmitted or received for one period of time. This technique eliminates the difficulty that the radio carrier wave transmitted is adversely affected by the radio carrier wave received. As a result, the radio carrier wave frequency band can be selected freely, and the communication of a plurality of mobile communication devices can be handled with only one radio relay device. Thus, the radio system of the subject invention becomes relatively economical in its implementation.

What is claimed is:

1. A radio relay system comprising:
   an external conductor;
   a first antenna located on said external conductor for transmitting and receiving radio carrier wave signals of a first and a second frequency, respectively;
   a second antenna located on said external conductor for transmitting and receiving radio carrier wave signals of a third and a fourth frequency, respectively;

a skirt for each of said antennas located on said external conductor, each said skirt having a length equal to a quarter of the wavelength of said first and third frequencies, respectively;

a relay circuit in said external conductor further comprising:

branching filter circuit means for extracting a portion of said radio carrier wave signals of said first and third frequencies;

adjusting unit circuit means coupled to said branching filter circuit means and being responsive to the extracted portions of said first and third frequency signals for adjusting the amplitude and phase thereof and generating modified first and third frequency signals;

combining unit circuit means coupled to said adjusting unit circuit means for combining said first and third modified frequency signals with said radio carrier wave signals of said first and third frequencies respectively received by said second and first antenna for cancelling said first and third frequency signals; and transmitter-receiver circuit means for transmitting said radio carrier wave signal of said second frequency and received by said first antenna as a radio carrier wave signal of said second frequency from said second antenna, and for transmitting said radio carrier wave signal of said fourth frequency and received by said second antenna as a radio carrier wave signal of said first frequency from said first antenna.

2. A radio relay system according to claim 1 wherein said first and fourth frequencies comprise a first pair of frequencies which are relatively close to one another and said second and third frequencies comprise a second pair of frequencies which are also relatively close to one another.

3. A radio relay system according to claim 2 wherein said first and second pair of frequencies are separated by a relatively large frequency separation.

4. A radio relay system according to claim 1 wherein said branching filter circuit means includes a first and a second branching filter for respectively extracting said portions of said radio carrier wave signals of said first and third frequencies.

5. A radio relay system according to claim 4 and wherein said adjusting unit circuit means includes a first and a second adjusting unit respectively coupled to said first and second branching filter for generating said modified first and third frequency signals.

6. A radio relay system according to claim 5 and wherein said combining unit circuit means includes a first and a second adjusting unit respectively coupled to said first and second adjusting unit for combining and thereby cancelling said radio carrier wave signals of said first and third frequencies, respectively, received by said second and first antennas.

7. A radio relay system according to claim 1 wherein said external conductor comprises a conductive housing.

8. A radio relay system comprising:

a system housing:

a first antenna located on said housing for transmitting and receiving radio carrier wave signals of a first and a second frequency, respectively;

a second antenna located on said housing for transmitting and receiving radio carrier wave signals of a third and a fourth frequency;

a first and a second skirt respectively located on said housing adjacent said first and second antennas, said first and second skirts having respective lengths equal to a quarter of the wavelength of said first and third frequencies;

a relay circuit in said housing and further comprising:

a first and a second branching filter for extracting a portion of said radio carrier wave signals of said first and third frequencies;

a first and a second adjusting unit respectively coupled to said first and second branching filter and being responsive to the extracted portions of said first and third frequency signals for adjusting the amplitude and phase thereof and generating modified first and third frequency signals; and a first and a second combining unit respectively coupled to first and second adjusting unit for combining said first and third modified frequency signals with said radio carrier wave signals of said first and third frequencies respectively received by said second and first antenna for cancelling said first and third frequencies received by said second and first antenna; and circuit means for transmitting said radio carrier wave signal of said second frequency, received by said first antenna, as a radio carrier wave signal of said second frequency from said second antenna and for transmitting said radio carrier wave signal of said fourth frequency, received by said second antenna as a radio carrier wave signal of said first frequency from said first antenna.

9. A radio relay system according to claim 8 wherein said first and fourth frequencies comprise a first pair of frequencies which are relatively close to one another, said second and third frequencies comprise a second pair of frequencies which are relatively close to one another and wherein said first and second pair of frequencies are separated by a relatively large frequency separation.

10. A radio relay system according to claim 9 and additionally including control circuit means for controlling said first and second adjusting unit varying the amplitude and phase of said first and third frequency signals.

11. A radio system according to claim 10 wherein said transmitter-receiver circuit means includes:

a first receiver section coupled to said first antenna for detecting said radio carrier wave signal of said second frequency and generating a first output signal;

a first transmitter section coupled between said first receiver section and said second antenna and being responsive to said first output signal for modulating said radio carrier wave signal of said third frequency transmitted from said second antenna;

a second receiver section coupled to said second antenna for detecting said radio carrier wave signal of said fourth frequency and generating a second output signal; and a second transmitting section coupled between said second receiver section and said first antenna and being responsive to said second output signal for modulating said radio carrier wave signal of said first frequency transmitted from said first antenna.

12. A radio system according to claim 11 wherein said first and second output signals are respectively coupled through said control circuit means to said first and second transmitting section.

13. A radio system according to claim 8 wherein said housing comprises an electrically conductive housing.

14. A radio system according to claim 13 wherein said electrically conductive housing comprises a waterproof housing.

* * * * *